United States Patent Office 3,547,656
Patented Dec. 15, 1970

3,547,656
METHOD OF PREPARING POULTRY CHUNKS
Kermit F. Schlamb, Pittsburgh, Pa., assignor, by mesne assignments, to Calgon Corporation, a corporation of Delaware
No Drawing. Filed Dec. 19, 1966, Ser. No. 602,559
Int. Cl. A22c 21/00
U.S. Cl. 99—107                              3 Claims

ABSTRACT OF THE DISCLOSURE

A method is provided for preparing poultry chunks which are resistant to disintegration in further cooking on poultry pies and like dishes comprising the steps of cooking and deboning poultry, admixing to the cooked de-boned poultry about 5% to 10% of ground raw poultry meat, about 5% to 10% of ground raw poultry skin, about 0.1% to 1.0% of a molecularly dehydrated phosphate and sufficient salt to taste, placing said mixture in a container, cooking at a temperature in excess of 160° F. and cubing the resulting cooked poultry flesh.

---

This invention relates to poultry treatment and particularly to the treatment of poultry or fowl to prevent its disintegration or cooking into fine, hair-like fibers.

Large amounts of poultry are used in the manufacture of cooked, packaged and frozen products such as pies, stews, soups and the like in which the poultry is cut into small pieces. One of the problems which has beset this particular area of the poultry processing field is that the cut-up poultry disintegrates in the mixture into fine, hair-like fibers instead of remaining in chunks. This is undesirable for several reasons. First, it gives the impression that chicken meat is present only in very small quantity because all chunks have disintegrated and second, it is much less attractive and tasty than such products where the meat chunks remain.

I have discovered a method of overcoming this problem. I have found that the problem can be overcome by adding to cooked de-boned chicken, a ground mixture of raw chicken flesh, raw chicken skin, molecularly dehydrated phosphate and salt, stuffing the mixture into a casing and cooking at pasteurizing temperature (160° F.). The resulting solid mass of poultry meat can be cut into cubes and added to chicken pies and the like, cooked, frozen and reheated without the chicken cubes losing their identity. Preferably, I use about 5% to 10% raw chicken meat, 5% to 10% raw chicken skin, 0.2% to 0.6% sodium tripolyphosphate and salt to taste, based on the weight of the cooked de-boned chicken being treated.

I may use any molecularly dehydrated phosphate in the range of 0.1% to 1.0% together with sufficient salt for taste. The mixture is cooked at a temperature in excess of 160° F.

The invention can perhaps be best illustrated by the following example.

EXAMPLE I

Ten pounds of cooked, de-boned chicken were mixed with a ground mixture containing 0.5 lb. of raw chicken meat and 0.5 lb. raw chicken skin and 0.05 lb. of sodium tripolyphosphate with sufficient salt for flavor. The mixture was placed in a casing and cooked at 160° F. for 1 hour. The casing was cooled and removed and the meat therein cut into ¾ inch squares and mixed with a usual chicken pie formulation. The pie was cooked in the usual manner alongside pies made using chicken without any treatment. The cooked pies were opened. The chicken in the treated pie remained in chunks while that in the untreated pie disintegrated into small fibers.

EXAMPLE II

Ten pounds of cooked, de-boned turkey were mixed with a ground mixture of 0.6 lb. of raw turkey flesh, 0.5 lb. of raw turkey skin, 0.04 lb. of sodium tripolyphosphate and salt to flavor. The mixture was treated as in Example I and formulated into turkey pies with results identical to Example I.

In the foregoing specification, I have set out certain preferred practices and embodiments of my invention; however, it will be understood that this invention may be otherwise embodied within the scope of the following claims.

I claim:
1. The method of preparing poultry chunks for poultry pies, stews and soups, consisting of the steps of cooking and de-boning the poultry to be used, admixing to the cooked, de-boned poultry about 5% to 10% of ground raw poultry meat, about 5% to 10% of ground raw poultry skin, about 0.1% to 1.0% of a molecularly dehydrated phosphate and sufficient salt for taste, placing said mixture in a container, heating said mixture at a temperature in excess of 160° F. until cooked and cubing the resulting cooked flesh.
2. The method as claimed in claim 1 wherein the molecularly dehydrated phosphate is sodium tripolyphosphate.
3. The method as claimed in claim 1 wherein the container is a casing.

References Cited
UNITED STATES PATENTS

| | | | |
|---|---|---|---|
| 3,032,421 | 5/1962 | Buchholz | 99—108X |
| 3,285,753 | 11/1966 | Schwall et al. | 99—107 |
| 3,413,127 | 11/1968 | Schwall et al. | 99—107 |
| 3,024,113 | 3/1962 | Torr | 99—107 |

HYMAN LORD, Primary Examiner